April 17, 1962 W. P. SCHMITTER 3,029,661
ALL PURPOSE SPEED REDUCER
Filed July 9, 1959 10 Sheets-Sheet 1

INVENTOR
WALTER P. SCHMITTER
BY
ATTORNEY

April 17, 1962 W. P. SCHMITTER 3,029,661
ALL PURPOSE SPEED REDUCER
Filed July 9, 1959 10 Sheets-Sheet 2
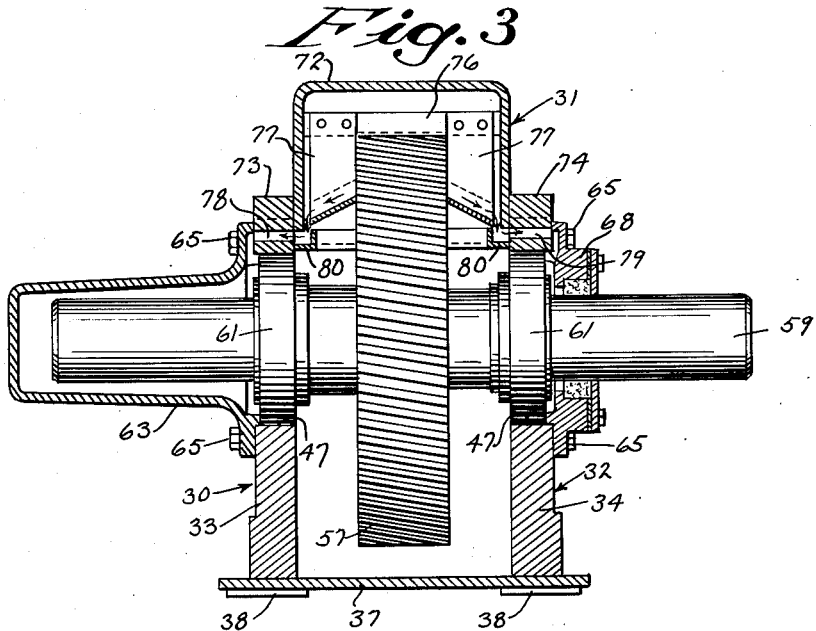
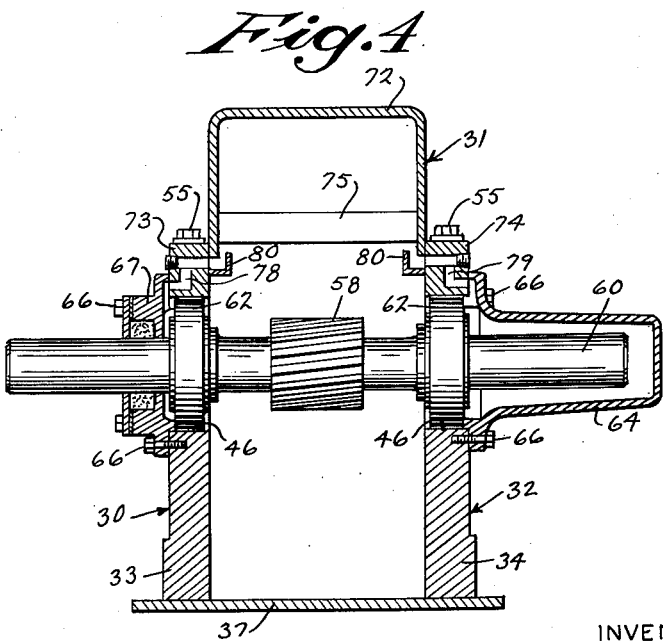
INVENTOR
WALTER P. SCHMITTER
BY *Arnold J. Ericsen*
ATTORNEY April 17, 1962 W. P. SCHMITTER 3,029,661
ALL PURPOSE SPEED REDUCER
Filed July 9, 1959 10 Sheets-Sheet 3

INVENTOR
WALTER P. SCHMITTER

BY
ATTORNEY

April 17, 1962 W. P. SCHMITTER 3,029,661
ALL PURPOSE SPEED REDUCER
Filed July 9, 1959 10 Sheets-Sheet 4

INVENTOR
WALTER P. SCHMITTER

BY
Arnold J. Ericsen

ATTORNEY

April 17, 1962 W. P. SCHMITTER 3,029,661
ALL PURPOSE SPEED REDUCER
Filed July 9, 1959 10 Sheets-Sheet 5
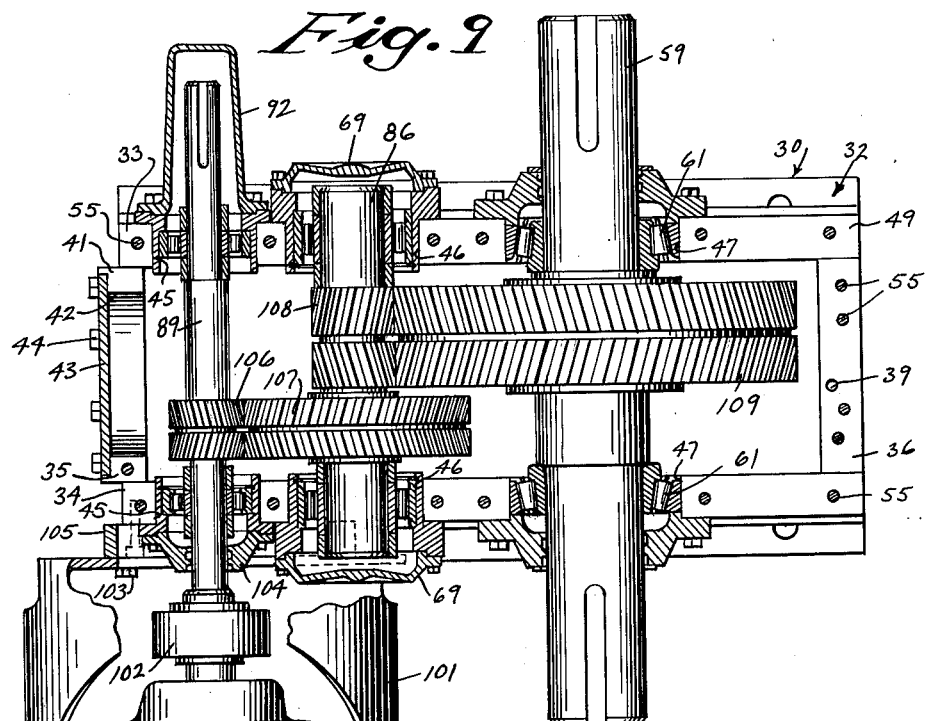
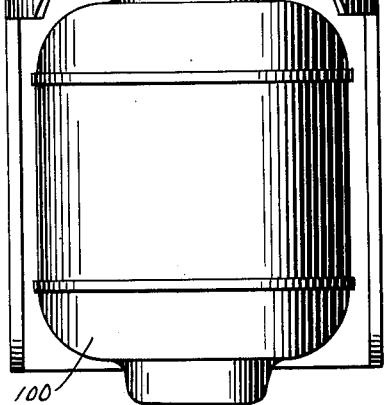
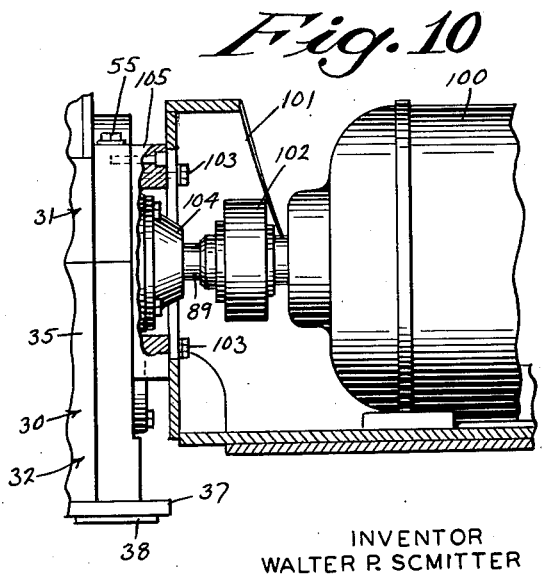
INVENTOR
WALTER P. SCMITTER
BY
ATTORNEY

INVENTOR
WALTER P. SCHMITTER

BY

ATTORNEY

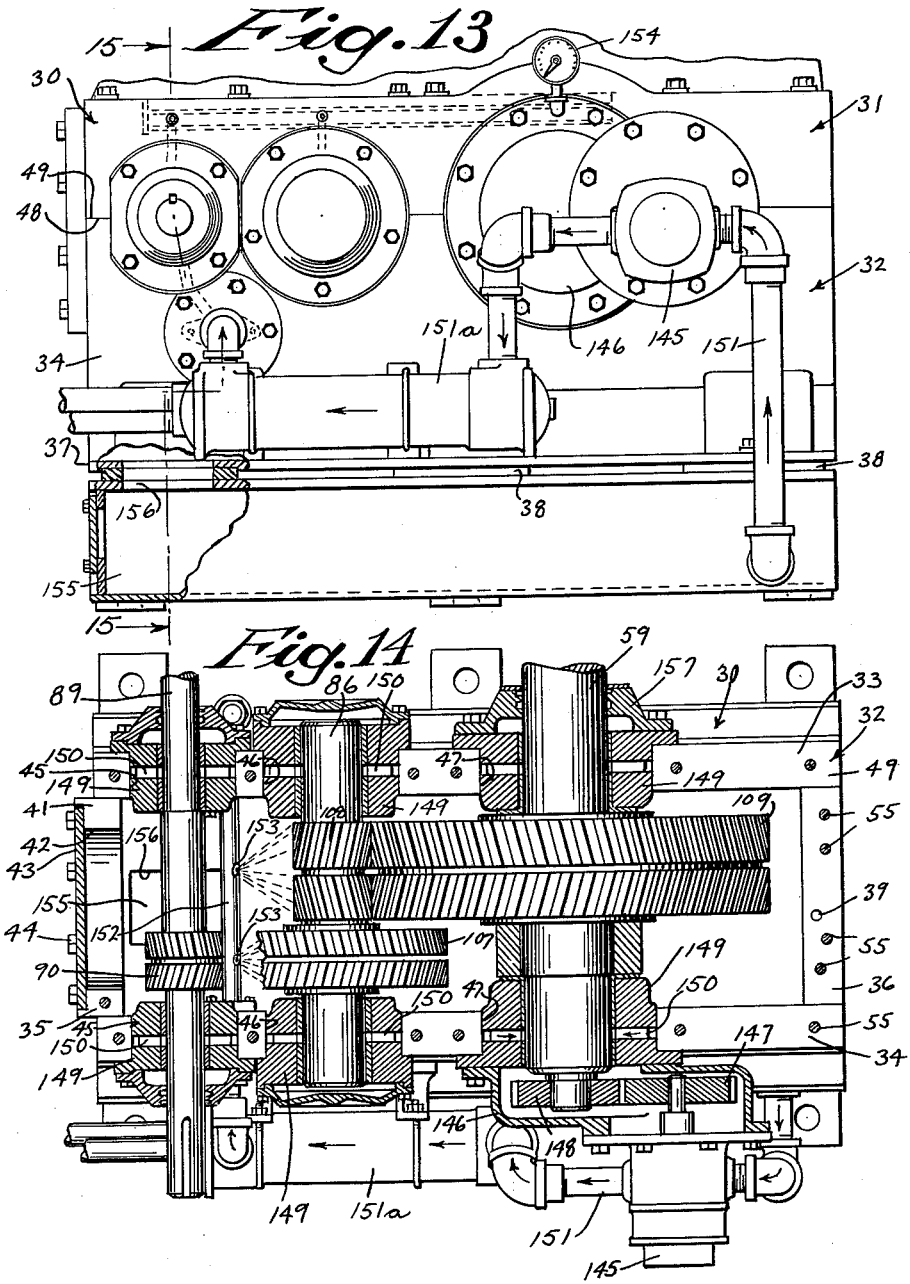

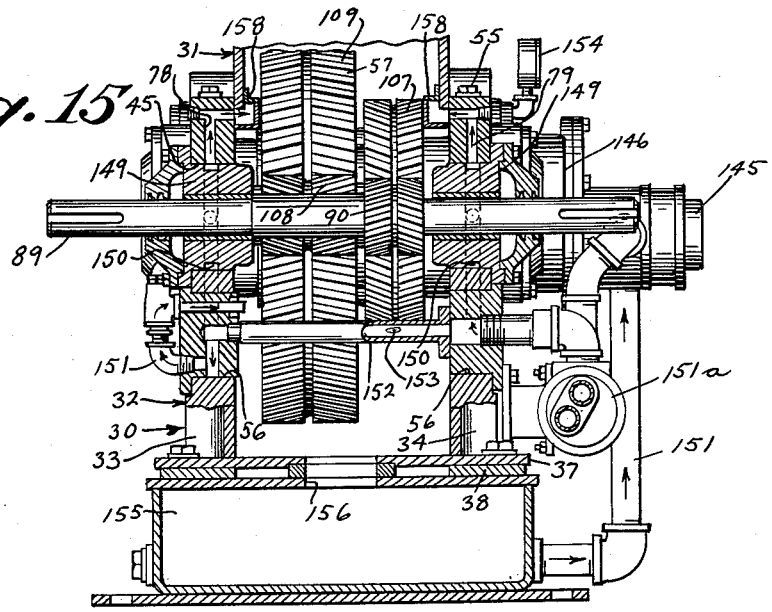
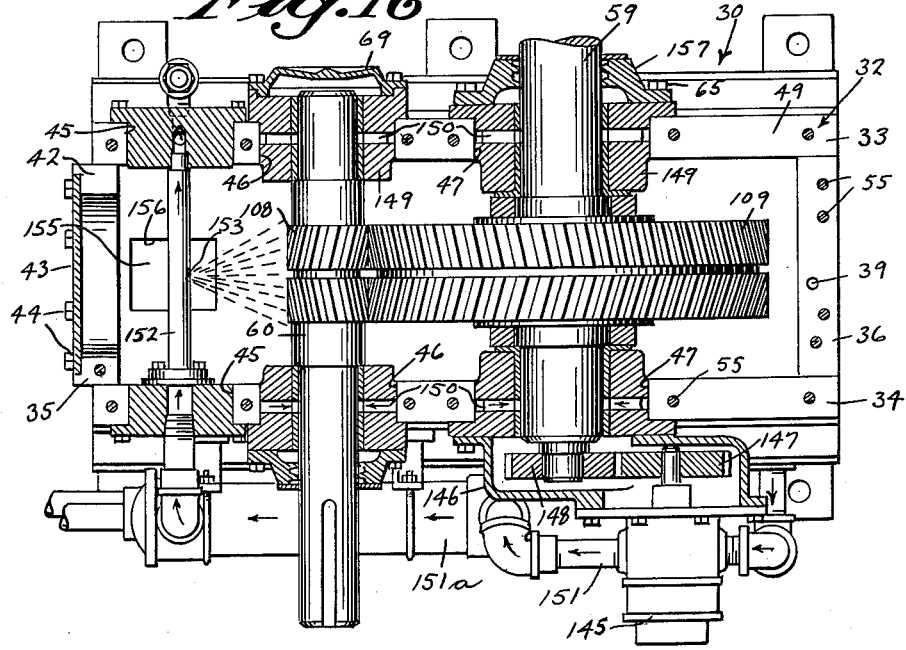

April 17, 1962 W. P. SCHMITTER 3,029,661
ALL PURPOSE SPEED REDUCER
Filed July 9, 1959 10 Sheets-Sheet 9

INVENTOR
WALTER P. SCHMITTER

BY

ATTORNEY

United States Patent Office 3,029,661
Patented Apr. 17, 1962

3,029,661
ALL PURPOSE SPEED REDUCER
Walter P. Schmitter, Wauwatosa, Wis., assignor to The Falk Corporation, Milwaukee, Wis., a corporation of Wisconsin
Filed July 9, 1959, Ser. No. 826,016
7 Claims. (Cl. 74—606)

The present invention relates to speed reducers of the gear type and in particular to an all purpose speed reducer providing means for interchangeability of gears and for the mounting of auxiliary devices adapted to function therewith.

There have been various attempts in the past to provide speed reducers arranged for interchangeability of gears and other operating components, but these have been of complex construction and provided considerable obstacle for access to the gears contained therein. The prior devices, in certain instances required complete draining of lubricant before the various operating components could be removed for interchangeability purposes, maintenance, or replacement of worn parts. Efforts have also been made to provide devices that permit interchangeability and selection of a minimum number of mating gear sets, but these devices include assemblies of gears arranged about a central axis tending to group the gears in close relationship to one another, and to thereby impose additional difficulties in their removal. Such devices also lack universatility in prohibiting the use of right angle and other useful drive positions. Even in cases where such right angle adaptation was possible, the prior art devices required special axis openings and were difficult to assemble.

The present invention contemplates an interchangeable speed reducer including the various adavntages of prior speed reducers, and in addition, provides a readily accessible unit adapted for ready access to gearing components without requiring drainage of lubricant, and which further provides a substantial reduction in number of gears by using industry-accepted ratios and interchanging gears between unit sizes.

The housing structure is preferably from fabricated steel plate, rather than being cast as a single member, to provide an essentially stronger construction, as well as permitting a simplified construction eliminating the need for elaborate coring and interfering strengthening web members, and further eliminating the need for warehousing a supply of patterns ordinarily required in casting techniques. The fabricated construction of the present unit also eliminates a substantial amount of machining in that the steel plate used as side and end panels requires only a minimum number of straight passes through a straddle mill, wherein no special setups are used. Whereas, conventional housings require considerable exterior surface machining including special setups for spot facing at the various openings for bearing supports, without providing an overall, generally flat surface. The flat or planar exterior surfaces of the present housing permits ready and simplified mounting of accessory and auxiliary equipment such as fans, quadruple reduction units, backstops and motor mountings.

Another important advantage of fabricated construction is that it permits the use of commercially obtainable grades and thicknesses of steel which may be cut by electric or gaseous arc by means of template tracing in multiple numbers and to obtain parallel sides, having like configuration.

The construction of the present invention also permits ready interchange and incorporation of either single or double helical gears, and either sleeve or roller bearings as desired. Each of the bearings of the single and double reduction units, as well as the low speed and intermediate speed bearings of triple reduction units are journaled with their axes in parallel relationship along a line of cleavage between an upper and a lower section of the housing. The feature of interchangeability also permits a low speed gear of one unit to be used as a higher speed gear for a next larger unit.

The present invention further contemplates a design permitting relatively shorter bearing spans and provides a center-to-center bearing span dimension of a selected ratio with the gear face width of the low speed gear, to thus provide a minimum of deflection therein.

The cover member of the approved speed reducer is also preferably provided with a transversely arranged tiebar to prevent sidewall deflection and also to permit a hanging of gear oil wipers where desired.

In high speed units, wherein lubricant is directed to the gear surfaces under pressure, the lubricant is directed both through channels which may be readily drilled into the fabricated side panels arranged to receive lubricant from gear pumps and is also sprayed directly on the gear mesh through perforated conduits mounted in the end cover, to thus provide a highly efficient lubrication system.

These and other objects and novel features of the present invention will be more clearly and fully set forth in the following specifications and claims.

In the drawings forming a part of this specification:

FIG. 3 is a sectional view of the device taken along line 3—3 of FIG. 1 with the low speed gear being shown in full lines, and particularly illustrating the improved bearing lubricating channels;

FIG. 4 is a sectional view taken along lines 4—4 of FIG. 1;

FIGS. 9 and 10 are illustrative of units wherein the drive motor is mounted directly to the side of the housing by means of a conventional "sugar scoop" bracket and the gears illustrated in FIG. 9 are of the double helical type mated for double reduction and mounted in anti-friction bearings;

FIGS. 11 and 12 are views taken in substantially the same plane as that of FIG. 2, and are illustrative of right angle drives, wherein FIG. 11 illustrates the housing adaptable for right angle drive with a double reduction unit mounted in anti-friction bearings, and FIG. 12 illustrates the same unit adapted for triple reduction drive;

Figure 2:
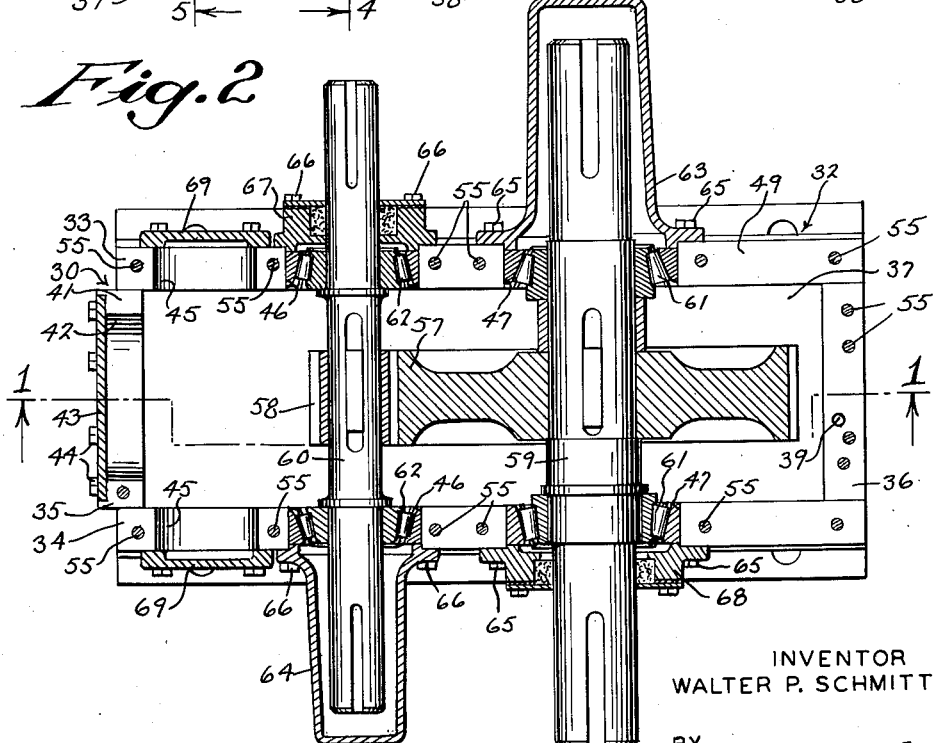
FIG. 2 is a sectional view of the reducer of FIG. 1, taken along lines 2—2 of FIG. 1, at the line of cleavage between upper and lower housing sections, and further illustrating the single reduction unit with its gears journalled in anti-friction bearings.
Figure 5:
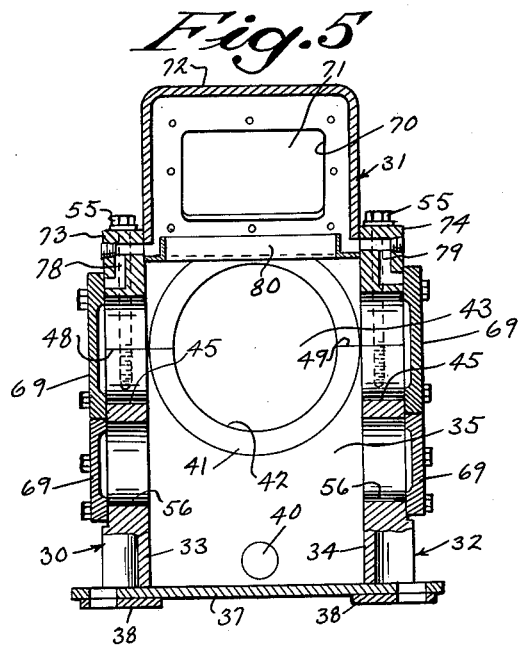
FIG. 5 is another sectional view taken along lines 5—5 of FIG. 1 and particularly illustrating the relationship of the bearing openings and the inspection opening.
Figure 7:
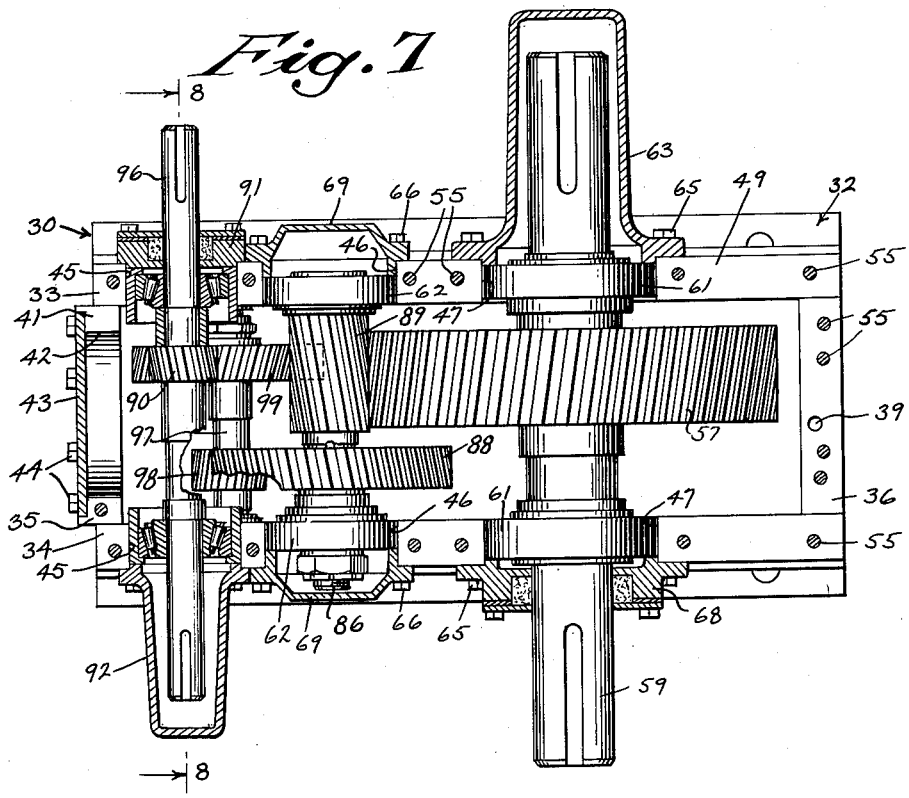
FIG. 7 is a view similar to FIG. 6, and further illustrating the same housing adapted for triple gear reduction, with single helical gears mounted in anti-friction bearings.
Figure 8:
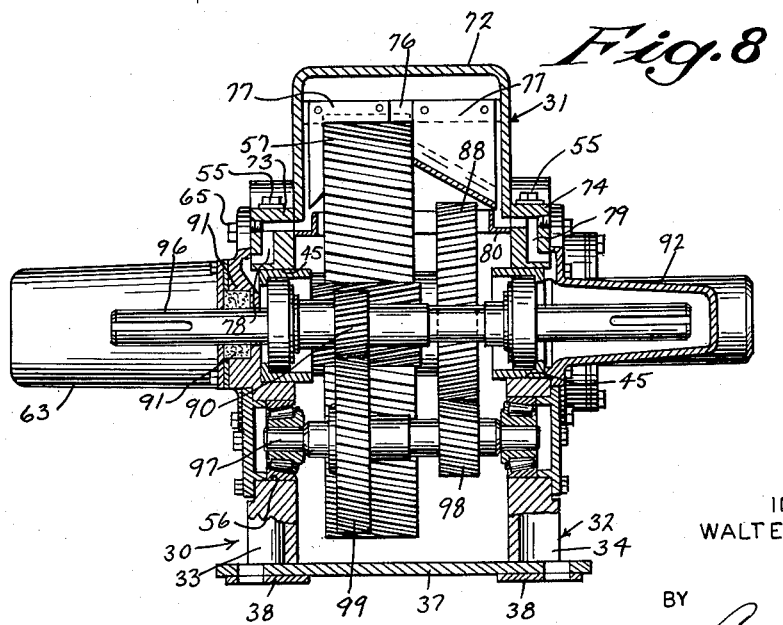
FIG. 8 is a vertical sectional view of the unit of FIG. 7 with the various gears shown in full lines and taken approximately on the plane of lines 8—8 of FIG. 7.
Figure 17:
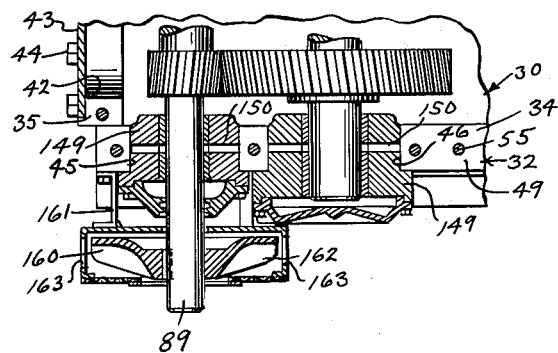
Figure 18:
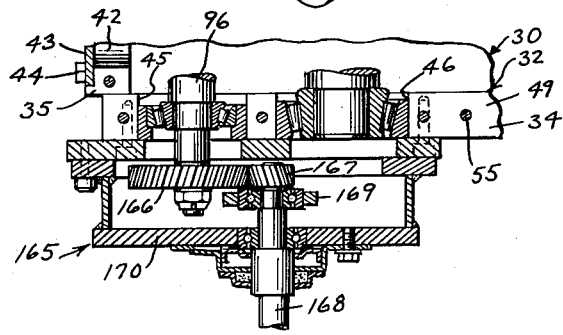

FIGS. 13-16, inclusive, are each illustrative of high speed forced lubricant feed units, wherein FIG. 13 is a side elevation showing the exterior of a unit adapted to the same general housing illustrated in the previous figures, and being shown mounted on a lubricant reservoir communicating with a pump;

And in particular:

FIG. 14 is a view taken on approximately the same plane as FIG. 2 and illustrative of a high speed unit utilizing double helical gears in double reduction relationship;

FIG. 15 is a fragmentary sectional view of a high speed unit taken on lines 15—15 of FIG. 13;

FIG. 16 is a view similar to the view of FIG. 14 but illustrating the unit adaptable for use in single reduction double helical gearing and with gears being journalled in conventional sleeve bearings;

FIG. 17 is a fragmentary sectional view illustrative of a fan mounting at the side of the housing for use in auxiliary cooling of the unit;

FIG. 18 is a fragmentary sectional view illustrating an auxiliary gear train unit mounted on a side panel of the housing to extend the reduction ratio of the triple reduction unit of FIGS. 7 and 8 to a quadruple reduction unit.

Figure 19:
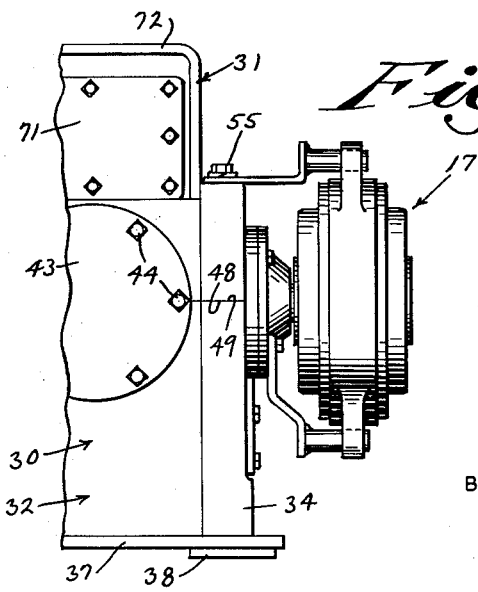
Figure 20:
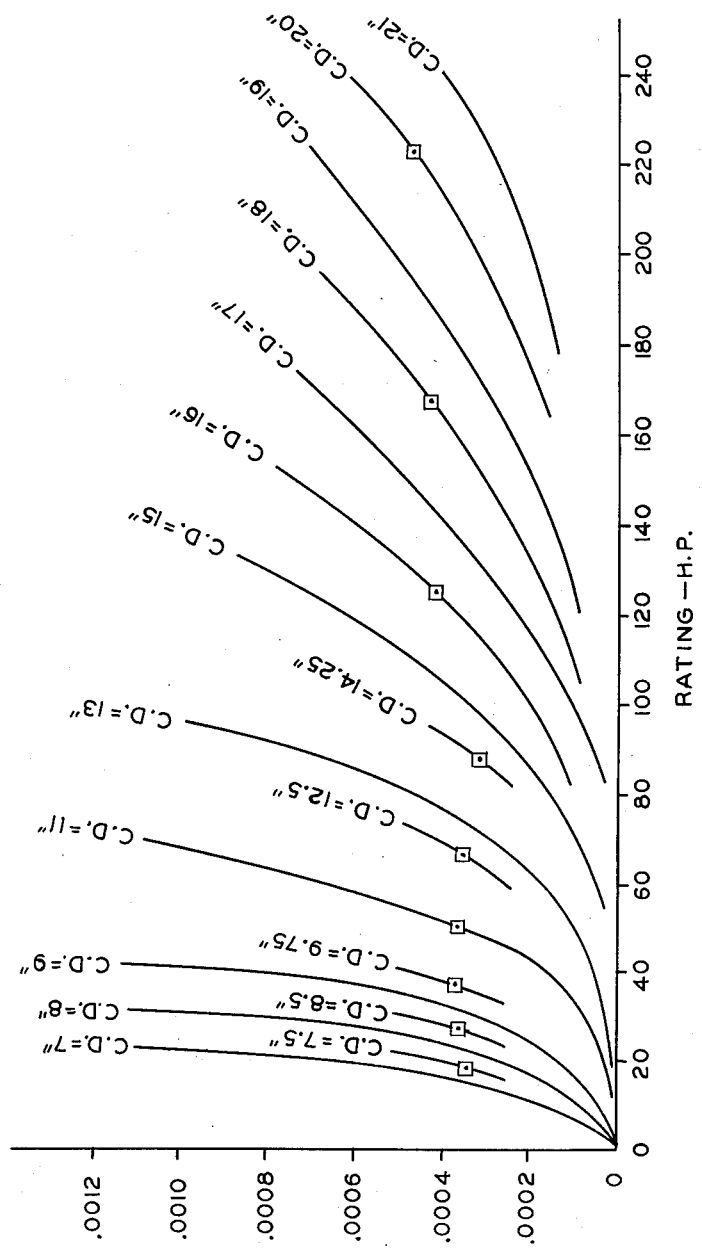

FIG. 19 is a side elevational view of a unit concluding the backstop of FIG. 18;

FIG. 20 is a graph illustrating the substantial consistency of shaft deflection in units made in accordance with the teachings of the present invention.

FIGS. 1–5 of the drawings are illustrative of an embodiment of the present invention wherein mating gears of the single helical type provide a single gear reduction, the gear shafts of which are each journaled in anti-friction bearings. The reducer housing 30 comprises an upper section 31 and a lower section 32. Each of these sections are of fabricated steel plate construction, wherein the side panels 33 and 34 are each welded to end walls 35 and 36 and to the base plate 37. The base plate 37 may include laterally spaced feet 38. It will be apparent that each of the end walls 35, 36 and the side panels 33, 34 present flat exterior surfaces for purposes hereinafter described. The end wall 36 extends laterally outwardly, as shown in FIG. 2, to present a marginal surface which is bored to provide a dip stick opening 39 as a means of measuring lubricant level. The end wall 35 includes a tapped opening for receiving a lubricant drain plug 40.

Figure 1:
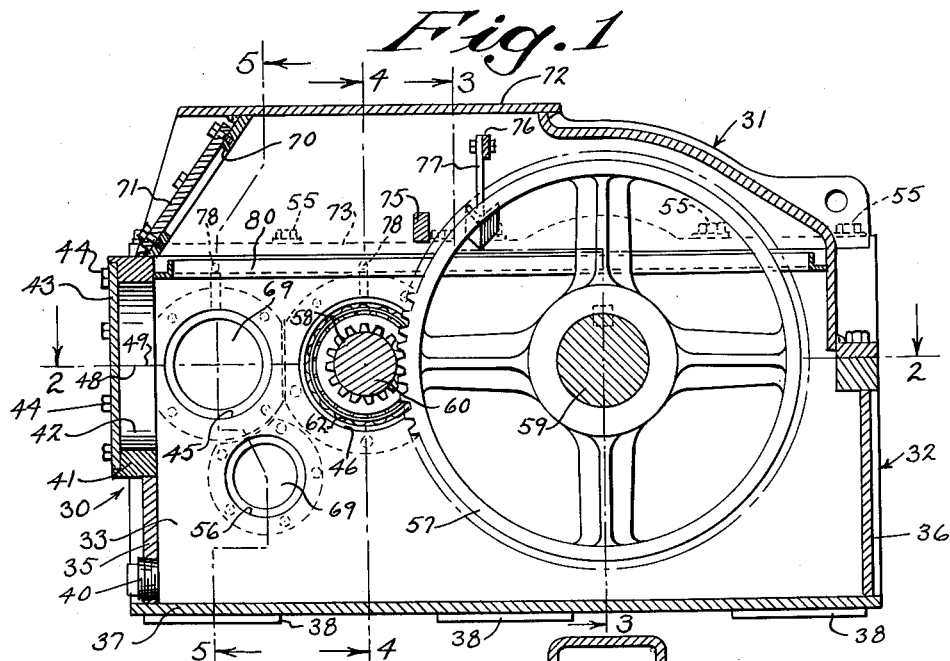
FIG. 1 is a vertical section of a speed reducer in accordance with the present invention and providing a single gear reduction.

It will be noted that the end wall 35 is preferably provided with a thicker plate section 41 suitable for supporting a bearing member for right angle installations as will hereinafter be described. The thicker plate 41 provided with a semi-circular groove, matching with a like groove in the upper section to define a circular bearing-supporting opening 42 and is covered by means of a removable cover plate 43 suitably flush mounted by means of threaded bolts engaging tapped openings in the plate 41. It is to be noted that the bearing opening 42, as well as the opposed bearing openings 45, 46 and 47 in the respective side panels 33 and 34, are defined by matching semi-circular grooves machined into each of the upper and lower sections 31 and 32 respectively. When the housing sections 31 and 32 are assembled as shown in FIG. 1, the grooves provide each of the bearing support openings in circular form bisected by the plane of cleavage defined by the mating surfaces 48 and 49, respectively, of the sections 31 and 32, to provide a co-planar parallel arrangement therewith. Thus, it will be apparent that the combination parallel shaft relationship, with the axis of each of the respective shafts being designed at the line of cleavage of the housing sections, presents a very useful and easily assembled and disassembled construction. Each of the gear shafts may be readily removed for interchangeability and maintenance by simply removing the laterally spaced mounting bolts 55 in each of the side panels 33, 34 and the end walls 35 and 36. The bolts 55 extend through the flange of the upper section 31 and engage tapped openings in the surface 49 of the lower section 32.

The bearing opening 56 spaced downwardly relative to the opening 45 is adapted to receive the shaft of a triple reduction gear, as shown in FIG. 8. Although this opening is not in parallel alignment with the plane of cleavage between the sections 31 and 32, it will be apparent that upon removal of the shafts respectively journaled in the openings 45, 46 and 47, that the shaft supported in opening 56 may be easily inserted and removed therefrom, as will later be described in connection with the description of the embodiments of FIGS. 6, 7 and 8.

As shown in the embodiment of FIGS. 1–5, the assembly includes a single reduction unit comprising a single helical, low speed driven gear 57 in meshing contact with a high speed drive gear 58. Each of the gears 57 and 58 is assembled in the usual manner to its respective shaft 59 and 60, which shafts are journaled at opposite ends by means of anti-friction, tapered roller bearings 61 and 62. The preferred construction provides double ended shafts for each of the gears to permit a more balanced construction and also to feature reversibility of the shafts in order to compensate for gear wear. It will be apparent that the steel plate fabricated housing 30 of the present invention provides smooth exterior faces for the side wall panels 33 and 34, which among other advantages, permit the ready mounting of shaft guards 63 and 64 by means of bored and tapped openings arranged to receive the respective mounting bolts 65 and 66. The bore openings for the mounting bolts may be of a re-entrance type which do not penetrate the entire side panel thickness, and accordingly, do not have to be plugged should it later become unnecessary to use them. It will also be apparent that oil retainer members 67 and 68 may be mounted directly to the flat exterior surfaces of the respective side wall members 33 and 34. In fact, the side wall members 33 and 34 may be bored and tapped at the factory with uniformly spaced bolt-receiving openings arranged to register with uniform openings in the shaft guards, oil retainers, auxiliary equipment such as motor mounting brackets, fans, and others to be later described. Removable closure caps 69 may also be provided for closing bearing or other openings when not in use.

To complete the construction of the relatively simplified reducer housing 30, the upper section 31 may be provided with an access or inspection opening 70, covered by removable closure member 71. It will also be apparent that the upper section 31 is preferably fabricated from thin stock providing the cover portion 72, and being welded to the relatively thicker stock, side panel portions 73 and 74 (see FIG. 3). Inasmuch as the present housing 30 is particularly adaptable for the mounting of various auxiliary devices, such as additional gear train units, fans, motor brackets and other items, as will later be described, considerable lateral stress components may be added to the side panel. In order to provide additional strength to the panel portions 33, 34 and 73, 74, the present invention features a tie bar 75 (see FIG. 4) transversely mounted in the upper section.

The housing 30 conveniently provides an upper transverse support bar 76 from which conventional oil wiper members 77 may be hung in spaced relationship at either side of the low speed gear 57. Thus, as shown in FIGS. 3 and 4, the side wall panel portions 73 and 74 of the upper section 31 may be bored to provide oil ports 78 and 79 at various bearing positions and communicating with an L-shaped oil receiving trough 80 mounted on each of the respective wall members of the section 31, and arranged to receive oil from the wiper members 77 to be delivered to the respective bores 78 and 79 for entrance to the respective bearings 61 and 62 supporting the shafts 59 and 60. The tie bar 75 also provides a convenient means for compensating for relative lack of strength in the thinner section 72 and aids in preventing the side panels 33, 34, 73 and 74 from bulging outwardly under loading stresses.

Figure 6:
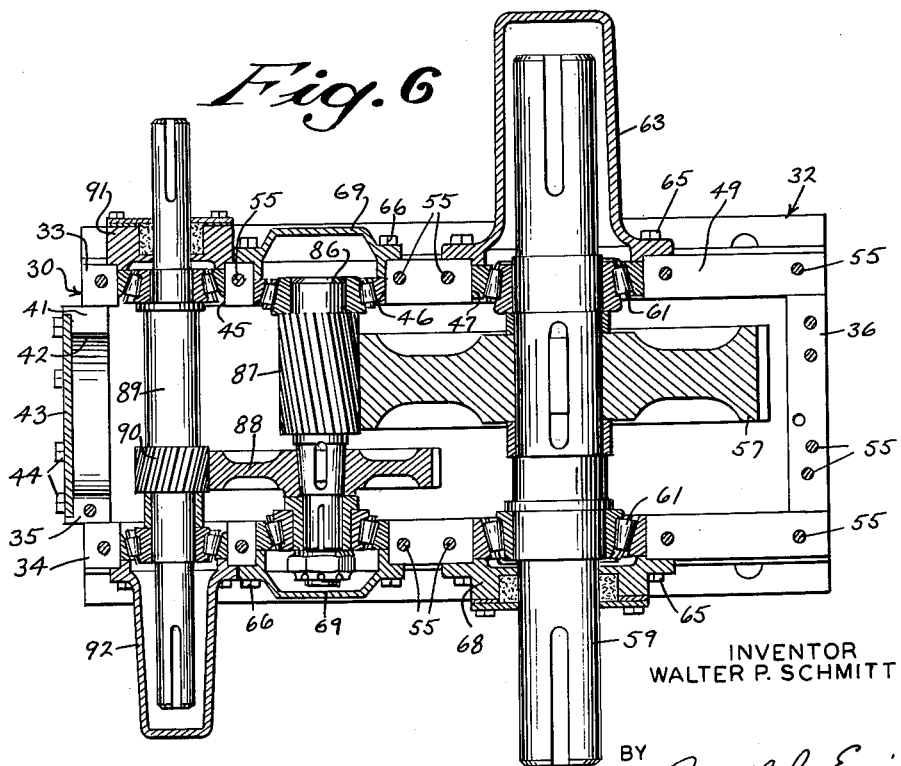
FIG. 6 is a cross sectional view taken in substantially the same plane as that of FIG. 2, and particularly illustrating the relationship of double reduction, single helical gears journalled and supported by anti-friction bearings and utilizing the housing of FIG. 2.

With reference to the embodiment of FIG. 6, it will be noted that the reducer housing 30 may be readily adapted for purposes of supporting double reduction gearing. To change gears, the cover plates 69 are readily removed from the openings 45 in the panels 33 and 34, and the upper section 31 is removed from the lower section 32 by unscrewing the bolts 55. An intermediate shaft 86 with its respective axially spaced gear members 87 and 88 is then positioned in the lower semi-circular portion of the opposed bearing support openings 46. In this instance, as the intermediate shaft does not extend through the openings, the openings 46 will be covered by respective cover plates 69 mounted in the same tapped bore receiving the mounting bolts 66 previously used for mounting the oil retainer 67 and the shaft guard 64. A new drive shaft 89 with its gear 90 is then journalled in the spaced bearing support openings 45, which openings are then respectively covered by an oil retainer 91 and a shaft guard 92 in the case of double ended shafts, as shown in FIG. 6. Again, the members 91 and 92 are mounted by means of mounting bolts in the same tapped openings that were provided for the cover plate 69 of the embodiment of FIGS. 1–5.

The reducer housing 30 of the previously described embodiments may also be conveniently adapted for use in triple reduction installations as shown in FIGS. 7 and 8. Here again the various meshing gears may be interchanged for speed and size requirements by simply removing the upper section and exposing the bearing support grooves defining the openings 45, 46 and 47. The high speed shaft 96 in this application is again seated in the opening 45 and meshes with an intermediate shaft 97 journalled in the opening 56. In the present embodiment, each of the remaining shafts bear the same reference numerals as previously described in connection with the single and double reduction embodiments in order to simplify the part identification. However, it is to be understood that various gears are shifted axially and are changed in contour, as shown, to accommodate intermediate gearing and may be of relatively different sizes for speed and reduction purposes. For instance, the low speed gear 57 of FIG. 7 is positioned closer to the side panel 33 than as shown in the previously described embodiments, but this would in no manner interfere with the teachings of the present invention.

Referring once again to the intermediate shaft 97 of FIGS. 7 and 8, it will be apparent that the shaft supports gears 98 and 99, respectively mating with the gears 88 and 90 of the second intermediate shaft 86. It will be apparent that the intermediate shaft 97 may be easily inserted and removed from the bearing support openings 56 when the shafts 89 and 86 have been removed from their respective openings 45 and 46, the semi-circular portions of which openings have been exposed upon removal of the upper section 31. Thus, the housing arrangement provides a minimum of interference for mounting and removal of the intermediate shaft 97 from its openings 56. As indicated in FIG. 8 the wipers 77 function in the same manner as heretofore described in connection with the first embodiment, but are of a slightly different configuration to conform to the axial shift of the low speed gear 57 on its shaft 59.

Before proceeding in the present description, it is also to be noted that the present invention contemplates a selected arrangement of center distances between the various gear shafts to provide a minimum number of gears interchangeable on the shafts of a given housing size when varied from one reduction to another, and also wherein certain gears of one size unit may be used in next larger units. This improved arrangement thereby presents, in combination, the advantages of the parallel shaft mounting, along with the feature of interchangeability of gear sets in a particular unit or in units of varying sizes. The present commercial embodiments of the present invention provide only 95 single helical gears to supply a line of 15 units with 8 single reduction ratios, 9 double reduction ratios and 9 triple reduction ratios. The 10 units of the 15 employ only one low speed gear for each ratio and the other 5 use variable centers on the low speed end and a constant high speed center distance. In previous units the use of single helical gears were limited to right angle units where there were employed 66 single helical gears for only 9 size units. Thus, 6 low speed gears were needed for 9 double reduction units and 4 intermediate gears for 3 triple reduction units. Twelve unit sizes provide 14 single reduction ratios, 15 double reduction ratios and 15 triple reduction ratios. If all the ratios were stocked for all the units, a total of 432 gears would be required with 14 low speed gears for single reduction unit, 15 high speed gear assemblies for the double reduction unit and 7 high speed gear assemblies for the triple reduction unit. Thus, where heretofore in only 33 units, there were required 432 double helical gears with a total inventory of only 248 gear 498, the present assembly provides a gear inventory for 45 units of only 124 double helical gears and 124 single helical gears with a total inventory of only 248 gear assemblies. The various combinations of fixed center distances will be apparent from Table I, as follows:

*Table I*

| Unit Size | Center Distance in Inches | | |
|---|---|---|---|
| | H. S. Gears, Triple | H. S. Gears, Double, Int. Gears, Triple | L. S. Gears, Single, Double, Triple |
| 50 | 3.750 | 4.688 | 7.500 |
| 60 | 3.750 | 5.625 | 8.500 |
| 70 | 4.688 | 6.250 | 9.750 |
| 80 | 4.688 | 7.500 | 11.000 |
| 90 | 5.625 | 7.500 | 12.500 |
| 100 | 5.625 | 8.500 | 14.250 |
| 110 | 6.250 | 8.500 | 16.000 |
| 120 | 7.500 | 9.750 | 18.000 |
| 130 | 7.500 | 11.000 | 20.000 |
| 140 | 8.500 | 12.500 | 22.500 |
| 150 | 8.500 | 14.250 | 25.000 |
| 160 | 9.750 | 16.000 | 29.000 |
| 170 | 11.000 | 18.000 | 32.000 |
| 180 | 12.500 | 20.000 | 35.000 |
| 190 | 14.250 | 22.500 | 39.000 |

The embodiments of FIGS. 9 and 10, in particular, illustrate the convenience in which the speed reducer housing 30 may be utilized for a so-called "motor reducer" unit. FIG. 9 illustrates a double helical gear arrangement for double reduction gearing, wherein the prime mover, or motor 100 is supported at a side wall 34 of the housing 30 by means of a conventional "sugar scoop" type bracket 101. The motor 100 is coaxial with the bearing support opening 45 for drive connection with the shaft 89 by means of a coupling 102. The bracket 101 is mounted by means of bolts 103 engaging tapped openings in the side wall 33 and upper side wall 74. In order to accommodate an oil retainer member 104, spacer sleeves 105 are positioned on the bolts 103.

It will be apparent that the housing 30 readily accommodates double helical gearing, as indicated by the mating gears 106 mounted on shaft 89, and the intermediate gears 107 and 108 mounted on the intermediate shaft 86, and in which the gear 108 is in mating engagement with the low speed gear 109. The usual advantages of double helical gearing may thus be utilized in the conventional housing construction 30 without any change or modification thereto.

Figure 11:
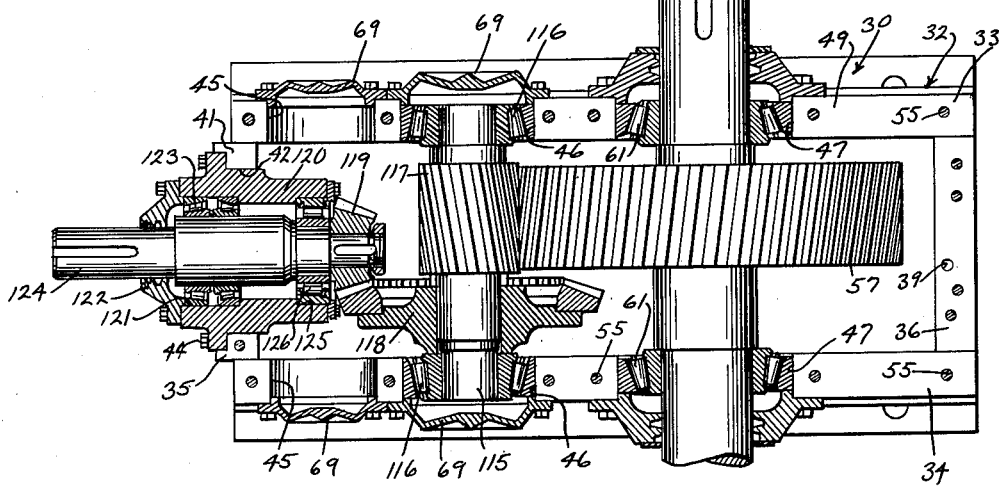
Figure 12:
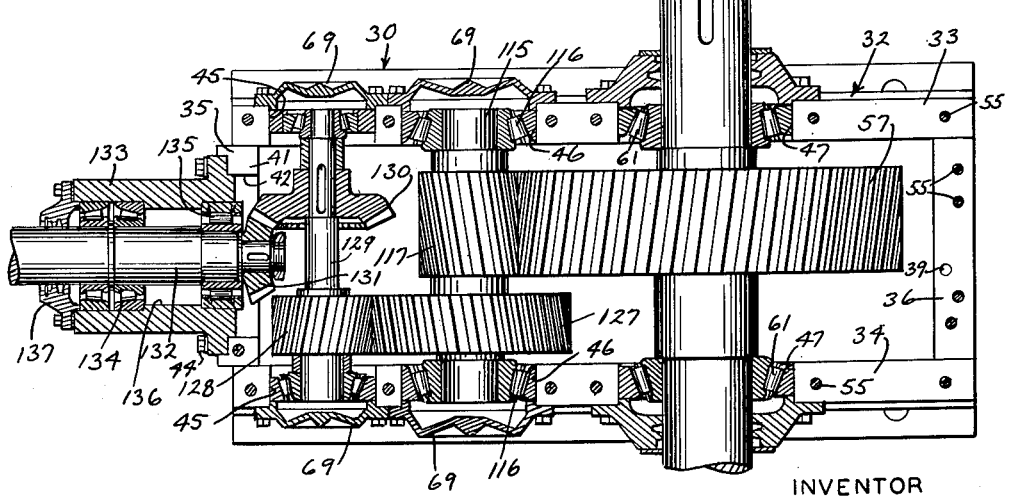

The embodiments of FIGS. 11 and 12 respectively relate to double and triple reduction assemblies for right angle drive arrangements.

The right angle arrangement permits the low speed shaft 59, upon which the low speed gear 57 is mounted, to be journaled, as previously described, in openings 47 without modification whatsoever to the housing. An intermediate shaft 115 is journaled in the openings 46 and included spaced bearing members 116, shown here to be of the anti-friction, roller bearing type, and has mounted thereon a gear 117 and a beveled driven gear 118, engageable with a mating beveled drive gear 119 projecting from a right angle drive support member 120. This support member 120 is preferably tubular and provides a through bore 121, including a removable oil retainer member 122 and being arranged to journal the bearing 123 for the right angle shaft 124 at one end thereof and terminating at its opposite end on enlarged bore 125 for supporting the bearing 126.

It will be apparent that the support member 120 and its shaft 124 and gear 119 may be easily inserted as a unit in the opening 42, previously described in connection with FIG. 1, by removing the bolted cover plate 43 (shown in FIG. 1), and inserting the support member 120 and securing the same by means of bolts 44 threadingly engaging the same bolt openings.

It will be apparent from FIG. 12 that a triple reduction, right angle unit may be readily provided for the housing 30. In this case, the low speed gear 57 again has its shaft 59 journaled in the opening 47 and the intermediate shaft 115 is journaled in the opening 46. However, in this case, the bevel gear 118 is replaced with a single helical gear 127 for engagement with a pinion 128 on shaft 129, which is journalled in the opposed openings 45. Here a beveled gear 130 is axially spaced from the gear 128 and is driven by the bevel drive gear 131 mounted on the right angle shaft 132. In this case, the support member 133 is mounted directly in the opening 42, without change to the opening, but does not project internally of the housing 30 as in the embodiment of FIG. 11. The right angle drive gear 131 mates with the gear 130 and is mounted on the shaft 132 which is journalled in the bearings 134, 135 supported in the bore 136 of the support 133. An oil retainer 137 covers the bore 136 at the opposite end.

The embodiments of FIGS. 13–16 are illustrative of speed reducer units of the high speed, forced oil feed type adaptable to the same housing 30, described previously in connection with the embodiments of FIGS. 1–12. It will be apparent that the side panels 33, 34 and end panels 35, 36 again form the basic structure of the housing 30. The housing also comprises an upper section 31 and a lower section 32 and includes the parallel shaft assembly of the various gears bisected by the plane of cleavage provided by the under-surface 48 of the upper section 31 and the top surface 49 of the lower section 32.

Inasmuch as the side panels are of fabricated construction and present unobstructed, relatively flat exterior surfaces, it will be readily apparent that the lubricant supplied to the speed reducer may be provided by auxiliary forced oil feed units mounted directly to the side panel 34. For instance, a pump 145 may be mounted on a housing 146 bolted directly to side 34 surrounding the bearing opening 47. In fact, the housing 146 may be mounted by means of bolts threadingly engaging the same openings provided for the oil retainer 68 of the embodiment of FIGS. 1 and 2. The pump may be conveniently gear driven by means of mating gears 147 and 148, in which gear 148 is driven by the low speed shaft 59. It will be apparent that in the embodiments discussed in connection with FIGS. 13–16 that conventional sleeve type bearings 149 are provided and is shown merely as being illustrative of permitting a choice of bearing to the ultimate customer. However, the sleeve type bearings 149 have particular adaption to forced oil feed and are provided with oil ports 150.

The pump 145 is arranged to deliver the lubricant through the piping 151, which may communicate in any convenient manner with the interior of the housing 30, but preferably, as in case of a double and single reduction unit, through the openings 56 which were heretofore described as supports for journaling the shaft of intermediate gearing in triple reduction units. Thus, it will be apparent that a double reduction unit, as shown in FIGS. 14 and 15, may be provided by positioning the drive shaft 89 in the openings 45 for engagement of its gear 90 with the gear 107 on the intermediate shaft 86, which in turn drives the gear 108 to supply power to the low speed double helical gear 109. The piping 151 communicates with a water-fed oil cooler 151a and supplies lubricating oil to a manifold 152 for discharge through spray openings 153 for direct application to the gears, as shown in FIG. 14. Other oil spray manifolds may also be provided if desired (not shown). It will also be apparent from FIG. 15 that the manifold 152 may preferably supply oil directly to the ports 150 for each of the bearings of the shafts 89, 86 and 59. Thus, a closed lubricating system may be provided as shown. With reference to FIG. 15, it will be apparent that a trough similar to the trough 80 of the embodiment of FIGS. 1–5 has been provided and includes the portion 80 removably covered by means of a channel member 158 secured to the inner wall of the upper section 31, to provide a closed path for a pressurized lubricant system. It will be apparent, however, that such channel member may be provided in other forms where desired, but the particular installation permits a simplified arrangement wherein the only modification to the conventional trough 80 for low pressure lubrication is to provide the single enclosing channel member 158 therefor as part of the upper section 31. An oil pressure gauge 154 may be supplied where desired.

It will also be apparent that the housing 30 is readily adaptable for mounting directly upon a lubricant reservoir 155 from which a fresh supply of oil may be drawn by the pump 145 and returned through an opening 156 after lubricating the various bearings and gears.

The particular embodiment of FIG. 16 is illustrative of a single reduction, double helical gear unit adaptable for use with the housing 30, and in which the pressurized oil supply manifold 152 may be mounted in the openings 45 of the side panels 33 and 34. In the particular embodiment, double helical gears 108 and 109 are disclosed as being journaled in sleeve-type bearings suitable for forced oil lubrication from the piping emerging from the opposite end of the manifold 152. The gears 108 and 109 are sprayed directly from the spray opening 153 of the manifold 152, which is supplied from the piping 151 communicating with the pump 145. Here again the pump is driven from the low speed shaft 59 and is mounted in similar manner as that disclosed in connection with FIGS. 13–15. Oil retainer members 157 are utilized on the shafts 59 of both embodiments and are mounted through the flange portion of the bearings directly to the exterior surface of the side panel 33. Again, the oil retainer 157 and the bearing 149 are mounted by means of bolts 65 engaging the same tapped openings as those provided for the shaft guard 63 in the embodiment of FIG. 2.

It will also be apparent from FIG. 17 that, in cases where auxiliary cooling is desired, that the relatively flat exterior base portion of the side panel 34 may include a fan 160 mounted directly thereto by means of a bracket 161. The blades 162 of the fan 160 are designed to spread air laterally of the exterior face of the panel 34 through openings 163 in the housing of the fan 160 and thereby keep the exterior surfaces relatively cool. It will be noticed that the fan may be driven from one protruding end of the double ended shaft 89, supported, as shown herein, by the sleeve type bearings 149. The smooth exterior surface of the panel 34 provides little or no interference with flow of cooling air thereacross.

In certain instances it becomes desirable to extend a triple reduction ratio into a quadruple reduction ratio, and this may be readily accomplished, as disclosed in FIG. 18, by means of an auxiliary gear train 165 illustrated in mounting position relative to the side panel 34 of the housing 30. A helical tooth gear 166 is fastened to the extending end portion of the shaft 96 of a triple reduction unit such as that disclosed in the embodiment of FIGS. 7 and 8, and meshes with a pinion 167 arranged to be driven by an input shaft 168 supported by bearing support 169 and by the panel 170 of the unit 165.

If it is desired to provide a backstop for the device, such arrangement is illustrated in FIG. 19, wherein the side panel 34 may have its exterior surface arranged to receive a conventional backstop member 175. Here the drive shaft (not shown) extends through its side panel opening to engage with the backstop mechanism (not shown) which includes the usual means for restricting rotation in a selected direction. Thus, the device provides positive prevention of reverse rotation or back run without back lash on conveyors, elevator head shafts and similar applications. It will again be apparent that the smooth exterior surface of the panel 34 requires no modification whatsoever to receive the unit, and the bracket member of the backstop unit 175 may be drilled for mounting in the usual threaded openings surrounding the bearing support openings.

Another feature of the present invention lies in the provision of a particular relationship between the housing width, measured from center-to-center of the bearing supported thereby, as compared to the width of the face of the low speed gear and the ratio of gear face width to gear diameter. The former ratio remains constant (2.5) while the latter ratio decreases from 1.7 to 1.5 as the center distance increases. It has been found that by selecting this ratio at a value of approximately 2.5, the maximum deflection of the gear shaft supporting the main bearing may be maintained at a substantially fixed dimension. With reference to the graph of FIG. 20, it will be apparent, from the curve points identified by the squares indicating embodiments of this invention, that the maximum deflection of the low speed shaft varies only between approximately .00035 inch and .00045 inch throughout a horse-power range of between 20 horse-power and 220 horse-power for a given gear ratio of 7.59 in a single reduction unit. Each curve of the graph is identified by the actual center distance selected for conventional gear face dimensions.

It will be apparent that the present invention has provided an improved speed reducer comprising a housing of fabricated construction of two mating sections defining a plane of cleavage therebetween, and in which said plane of cleavage bisects the axes of a series of laterally spaced shafts. The various center-to-center spacing of the said shafts are also selected for interchangeability within a particular unit and between units of varying power output.

I claim:

1. A speed reducer including a fabricated housing comprising an upper and a lower section each of which comprises opposed side panels having substantially planar exterior surfaces defining, when joined together, opposed, non-interrupted side panels in register with one another, said sections being respectively joined at their ends by means of opposed end panels, said sections each further defining a continuous surface arranged for mating relationship with the surface of an oppositely disposed section and defining a plane of cleavage therebetween, means for separably joining said sections and without interference with said registering side panel planar surfaces, a plurality of mating reducer gears respectively mounted upon a series of spaced parallel shafts, the said mating surface of each of the said sections defining sectoral portions disposed to register with one another at opposite side panel portions of said surfaces to provide axially aligned, spaced circular openings, each of said openings adapted to provide a journalling support for a respective one of said parallel gear shafts with the said shafts intersecting the aforesaid plane of cleavage.

2. A speed reducer including a housing comprising an upper and a lower section each of which comprises opposed side panels joined at their ends by means of opposed end panels, said sections each further defining a continuous surface arranged for mating relationship with the surface of an oppositely disposed section and defining a plane of cleavage therebetween, means for separably joining said sections, a plurality of mating reducer gears respectively mounted upon a series of spaced parallel shafts, the said mating surface of each of the said sections defining sectoral portions disposed to register with one another at opposite side panel portions of said surfaces to provide axially aligned, spaced circular openings, each of said openings adapted to provide a journalling support for a respective one of said parallel gear shafts with the said shafts intersecting the aforesaid plane of cleavage, the center spacing between the said shaft supporting circular openings being of progressively increasing dimension, wherein the low speed gear spacing of alternatively selected single, double and triple reduction reducer units of a selected output rating may be substituted for high speed gears of a double reduction unit, or in the alternative, for the intermediate gears of a triple reduction unit of a reducer of next larger output rating.

3. A speed reducer including a fabricated housing comprising an upper and a lower section each of which comprises opposed side panels having substantially planar exterior surfaces defining, when joined together, opposed, non-interrupted side panels in register with one another, said sections being respectively joined at their ends by means of opposed end panels, said sections each further defining a continuous surface arranged for mating relationship with the surface of an oppositely disposed section and defining a plane of cleavage therebetween, means for separably joining said sections and without interference with said registering side panel planar surfaces, a plurality of mating reducer gears respectively mounted upon a series of spaced parallel shafts, the said mating surface of each of the said sections defining sectoral portions disposed to register with one another at opposite side panel portions of said surfaces to provide axially aligned, spaced circular openings, each of said openings adapted to provide a journalling support for a respective one of said parallel gear shafts, the center spacing between the said shaft supporting circular openings being of progressively increasing dimension, wherein the low speed gear spacing of alternatively selected single, double and triple reduction reducer units of a selected output rating may be substituted for high speed gears of a double reduction unit, or in the alternative, for the intermediate gears of a triple reduction unit of a reducer of next larger output rating.

4. A motor reducer including a fabricated housing comprising an upper and a lower section each of which comprises opposed side panels having substantially planar exterior surfaces defining, when joined together, opposed, non-interrupted side panels in register with one another, said sections being respectively joined at their ends by means of opposed end panels, said sections each further defining a continuous surface arranged for mating relationship with the surface of an oppositely disposed section and defining a plane of cleavage therebetween, means for separably joining said sections and without interference with said registering side panel planar surfaces, a plurality of mating reducer gears respectively mounted upon a series of spaced parallel shafts, a motor directly connected to one of said shafts and having a supporting bracket mounted directly to the exterior surface of one of said side panels, the said mating surface of each of the said sections defining sectoral portions disposed to register with one another at opposite side panel portions of said surfaces to provide axially aligned, spaced circular openings, each of said openings adapted to provide a journalling support for a respective one of said parallel gear shafts, the center spacing between the said shaft supporting circular openings being of progressively increasing dimension, wherein the low speed gear spacing of alternatively selected single, double and triple reduction reducer units of a selected output rating may be substituted for high speed gears of a double reduction unit, or in the alternative, for the intermediate gears of a triple reduction unit of a reducer of next larger output rating.

5. A speed reducer including a fabricated housing comprising an upper and a lower section each of which comprises opposed side panels having substantially planar exterior surfaces defining, when joined together, opposed, non-interrupted side panels in register with one another, said sections being respectively joined at their ends by means of opposed end panels, said sections each further defining a continuous surface arranged for mating relationship with the surface of an oppositely disposed section and defining a plane of cleavage therebetween, means for separably joining said sections and without interference with said registering side panel planar surfaces, a plurality of mating reducer gears respectively mounted upon a series of spaced parallel shafts, bearings for said shafts, and interchangeable auxiliary gear fittings exteriorly of said panels and separably mounted directly thereto, the said mating surface of each of the said sections defining sectoral portions disposed to register with one another at opposite side panel portions of said surfaces to provide axially aligned, spaced circular openings, each of said openings adapted to receive said bearings to thereby provide a journalling support for a respective one of said parallel gear shafts, and pressurized lubricating means for said bearings and for said gears comprising a lubricant pump mounted directly to one of said opposed planar surfaces and operatively associated with and driven by one of said gear shafts, lubricant supply conduit communicating with said pump, and a lubricant reservoir, the various elements of said lubricating means being removably attachable to the said exterior surfaces and interchangeable with said auxiliary gear fittings.

6. A speed reducer including a fabricated housing comprising an upper and a lower section each of which comprises opposed side panels having substantially planar exterior surfaces defining, when joined together, opposed, non-interrupted side panels in register with one another, said sections being respectively joined at their ends by means of opposed end panels, said sections each further defining a continuous surface arranged for mating relationship with the surface of an oppositely disposed section and defining a plane of cleavage therebetween, means for separably joining said sections and without interference with said registering side panel planar surfaces, a plurality of mating reducer gears respectively mounted upon a series of spaced parallel shafts, bearings for said shafts, and interchangeable auxiliary gear fittings exteriorly of said panels and separably mounted directly thereto, the said mating surface of each of the said sections defining sectoral portions disposed to register with one another at opposite side panel portions of said surfaces to provide axially aligned, spaced circular openings, each of said openings adapted to receive said bearings to thereby provide a journalling support for a respective one of said parallel gear shafts, the center spacing between the said shaft supporting circular openings being of progressively increasing dimension, wherein the low speed gear spacing of alternatively selected single, double and triple reduction reducer units of a selected output rating may be substituted for high speed gears of a double reduction unit, or in the alternative, for the intermediate gears of a triple reduction unit of a reducer of next larger output rating, and pressurized lubricating means for said bearings and for said gears comprising a lubricant pump mounted directly to one of said opposed planar surfaces and operatively associated with and driven by one of said gear shafts, lubricant supply conduit communicating with said pump, and a lubricant reservoir, the various elements of said lubricating means being removably attachable to the said exterior surfaces and interchangeable with said auxiliary gear fittings.

7. A universal speed reducer unit including a housing and a plurality of reducing gear members contained therein and respectively mounted on a plurality of shafts, said housing comprising an upper and a lower section fabricated from opposed sheet metal side panels having substantially planar exterior surfaces defining, when joined together, opposed, non-interrupted side panels in register with one another, said sections being respectively joined at their ends by means of opposed end panels, said sections each further defining a continuous surface arranged for mating relationship with the surface of an oppositely disposed section and defining a plane of cleavage therebetween, means for separably joining said sections and without interference with said registering side panel planar surfaces, bearings for said shafts, the said mating surface of each of the said sections defining sectoral portions disposed to register with one another at opposite side panel portions of said surfaces to provide axially aligned, spaced circular openings, each of said openings adapted to provide a journalling support for a respective one of said parallel gear shafts and interchangeable auxiliary fittings for said gears exteriorly of said panels and separably mounted directly thereto, said housing being arranged for interchange of said shafts, said bearings and said auxiliary fittings without modification of said exterior surfaces thereof.

References Cited in the file of this patent
UNITED STATES PATENTS

| | | |
|---|---|---|
| 1,112,218 | Kennedy | Sept. 29, 1914 |
| 1,220,811 | Alquist | Mar. 27, 1917 |
| 1,496,867 | Bee | June 10, 1924 |
| 1,861,942 | Short | June 7, 1932 |
| 1,862,512 | Short | June 7, 1932 |
| 1,894,927 | Schmitter | Jan. 17, 1933 |
| 1,902,934 | Acker | Mar. 28, 1933 |
| 1,957,832 | Hamilton | May 8, 1934 |
| 2,317,117 | Schmelzer | Apr. 20, 1943 |
| 2,581,973 | Schaffer | Jan. 8, 1952 |
| 2,596,794 | Schmitter | May 13, 1952 |
| 2,600,912 | Olson | June 17, 1952 |
| 2,729,519 | Bottenhoen | Jan. 3, 1956 |
| 2,782,656 | McCarthy et al. | Feb. 26, 1957 |
| 2,832,230 | Schmitter | Apr. 29, 1958 |
| 2,873,615 | Wilkin | Feb. 17, 1959 |

UNITED STATES PATENT OFFICE
CERTIFICATE OF CORRECTION

Patent No. 3,029,661                      April 17, 1962

Walter P. Schmitter

It is hereby certified that error appears in the above numbered patent requiring correction and that the said Letters Patent should read as corrected below.

Column 6, line 19, for "with a total inventory of only 248 gear" read -- and 66 single helical gears for a total of --.

Signed and sealed this 21st day of August 1962.

(SEAL)
Attest:

ESTON G. JOHNSON
Attesting Officer

DAVID L. LADD
Commissioner of Patents